United States Patent

Makino et al.

(10) Patent No.: US 6,693,424 B2
(45) Date of Patent: Feb. 17, 2004

(54) MAGNETIC ROTATION ANGLE SENSOR

(75) Inventors: Masahiro Makino, Kariya (JP); Yasunari Kato, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/162,890

(22) Filed: Jun. 6, 2002

(65) Prior Publication Data

US 2002/0186009 A1 Dec. 12, 2002

(30) Foreign Application Priority Data

Jun. 8, 2001 (JP) ........................................ 2001-174405

(51) Int. Cl.$^7$ ................................................. G01B 7/30
(52) U.S. Cl. .............................. 324/207.25; 324/207.2; 324/207.21
(58) Field of Search .................. 324/207.2, 207.21, 324/207.22, 207.25; 335/302, 304; 336/84 M

(56) References Cited

U.S. PATENT DOCUMENTS

| | | | | |
|---|---|---|---|---|
| 5,459,399 A | * | 10/1995 | Durand et al. | ......... 324/207.24 |
| 5,798,639 A | * | 8/1998 | McCurley et al. | ....... 324/207.2 |
| 6,268,722 B1 | * | 7/2001 | Kogure et al. | ......... 324/207.25 |
| 6,356,073 B1 | * | 3/2002 | Hamaoka et al. | ........ 324/207.2 |
| 6,414,482 B1 | * | 7/2002 | Mase | ...................... 324/207.2 |
| 6,448,762 B1 | | 9/2002 | Kono et al. | |
| 6,476,600 B2 | * | 11/2002 | Kono et al. | .............. 324/207.2 |
| 6,501,265 B2 | * | 12/2002 | Nakamura et al. | ....... 324/207.2 |
| 6,559,637 B2 | * | 5/2003 | Miyata et al. | ........... 324/207.2 |

FOREIGN PATENT DOCUMENTS

JP 11-83422 3/1999

* cited by examiner

Primary Examiner—N. Le
Assistant Examiner—Darrell D Kinder
(74) Attorney, Agent, or Firm—Nixon & Vanderhye P.C.

(57) ABSTRACT

A magnetic rotation angle sensor has a rotor and a stator. Magnets are disposed to supply a magnetic flux that is modulated in accordance with the rotation angle. Magnetic sensor elements detect the magnetic flux and output signals indicative of the rotation angle between the rotor and the stator. External magnetic guides are disposed on both axial sides of the cores. The external magnetic guides provide a magnetic path that runs axially to avoid the magnetic sensor elements. The external magnetic guides are distanced enough from the rotor and the stator to reduce leakage of the magnetic flux supplied by the magnets. The magnets have enough height in magnetized direction so as to reduce short-circuiting leakage of the magnetic flux.

16 Claims, 4 Drawing Sheets

MAGNETIC ROTATION ANGLE SENSOR

CROSS REFERENCE TO RELATED APPLICATION

This application is based on Japanese Patent Application No. 2001-174405 filed on Jun. 8, 2001 the contents of which are incorporated herein by reference.

BACKGROUND OF THE INVENTION

1. Field of the Invention

The present invention relates to a magnetic rotation angle sensor for detecting a rotation angle of a rotor relative to a stator.

2. Description of Related Art

A magnetic sensor can be used for detecting a magnetic flux modulated in accordance with a detection object, such as a rotation angle. However, the magnetic sensor detects not only the modulated magnetic flux but also an external magnetic flux. As a result, the magnetic sensor outputs a detection signal with noise caused by the external magnetic flux.

For example, FIGS. 6 and 7 show an arrangement of the magnetic sensor for detecting rotation angle. The magnetic rotation angle sensor has a stator and a rotor. One of the stator and the rotor has a magnetic flux modulator that provides a magnetic flux and modulate it in accordance with a relative rotation angle between the rotor and the stator so that the modulated magnetic flux passes through the other one of the stator and the rotor. The other one of the rotor and the stator has a magnetic sensor element for detecting the modulated magnetic flux, and outputs a signal indicative of the rotation angle. For example, the magnetic flux modulator may be provided by cores that vary a direction of the magnetic flux or an amount of the magnetic flux in accordance with a relative rotational position of the rotor and the stator.

In the illustrated case, the magnetic rotation angle sensor has a first portion that has a yoke 13. The yoke 13 is formed in a substantially cylindrical shape to define an inner cavity. The yoke 13 is made of magnetic material and defines two gaps 11 for receiving magnets 12 respectively. The gaps 11 are located in a diametric relationship on the yoke 13 and separate the yoke 13 into two portions. The magnets 12 are magnetized in tangential directions to a circle defined by the yoke 13. The magnetized axes D1 and D2 are parallel with each other, and directed in the same direction. A second portion that has a core 16 and a magnetic sensor element 15 is disposed inside the first portion. The core 16 is made of magnetic material. The core 16 defines a gap 14 that separates the core 16 into two members at a diametric line. Two magnetic sensor elements 15 are disposed in the gap 14. Each of the magnetic sensor elements 15 is a molded IC including the Hall effect element. The magnets 12 provide a magnetic flux passing through the yoke 13, the core 16 and the magnetic sensor element 15. A relative rotation of the first portion and the second portion changes a relative positional relationship between the yoke 13 and the core 16. The magnetic flux is modulated in accordance with the relative positional relationship between the yoke 13 and the core 16. The magnetic sensor element 15 outputs a signal in accordance with the modulated magnetic flux that is indicative of relative rotation angle between the first and second portions. For example, the yoke 13 may rotate as the rotor and the core 16 may be fixed as the stator.

According to the arrangement described above, if the sensor is disposed in an external magnetic field, the sensor is influenced by the external magnetic field. For example, if an external magnetic flux may pass the core 16 in a diagonal direction through a path indicated by a broken line P4 as shown in FIG. 6, an output signal of the magnetic sensor element 15 indicates an incorrect angle.

In a case in which the external magnetic field is applied in a direction perpendicular to a rotation axis of the rotor, the magnetic flux may pass the yoke 13 and the core 16 in a diametric direction through a path indicated by a broken line P5 as shown in FIG. 7. In a case of above, the magnetic sensor element 15 also outputs an incorrect signal.

SUMMARY OF THE INVENTION

It is an object of the present invention to provide a magnetic sensor that is capable of reducing an influence of an external magnetic field.

It is another object of the present invention to provide a magnetic sensor that is capable of detecting a rotation angle accurately.

It is a still another object of the present invention to provide a magnetic sensor that is capable of reducing an influence of an external magnetic field while preventing a short-circuiting leakage of the magnetic flux that is provided by a magnet.

According to a first aspect of the present invention, a magnetic rotation angle sensor for detecting a rotation angle of a rotor relative to a stator comprises a magnet, a yoke, a core, and a magnetic sensor element that detects the magnetic flux modulated by the core. A first means is provided for providing an external magnetic path for an external magnetic flux. The external magnetic path avoids the magnetic sensor element, and has a magnetic resistance lower than that of a magnetic path passing through the magnetic sensor element. Therefore, the external magnetic path guides the external magnetic flux rather than the magnetic path passing through the magnetic sensor element. As a result, the influence of the external magnetic field is reduced. A second means is provided for reducing short-circuiting leakage of the magnetic flux supplied by the magnet. Therefore, the yoke and the core receives sufficient amount of the magnetic flux from the magnet and the magnetic sensor element outputs accurate detection signal.

According to another aspect of the present invention, an additional external magnetic guide provides the external magnetic path. The external magnetic guide provides an axially extending external magnetic path.

According to a still another aspect of the present invention, the magnet is magnetized in an oblique direction so as to provide a shorter gap between the yokes and a longer distance between the poles. This arrangement provides the external magnetic path in the yoke, and provides a sufficient distance between the poles to reduce short-circuiting leakage of the magnetic flux supplied by the magnet.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Figure 1:
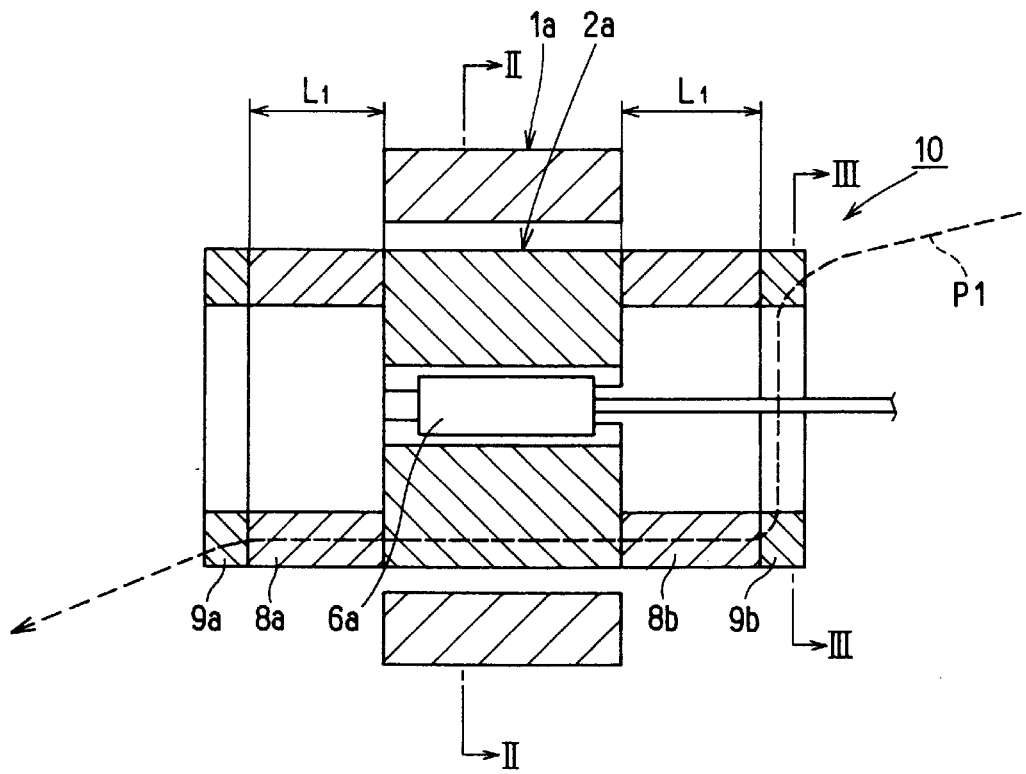
FIG. 1 is a longitudinal sectional view showing a magnetic rotation angle sensor according to a first embodiment of the present invention.
Figure 2:
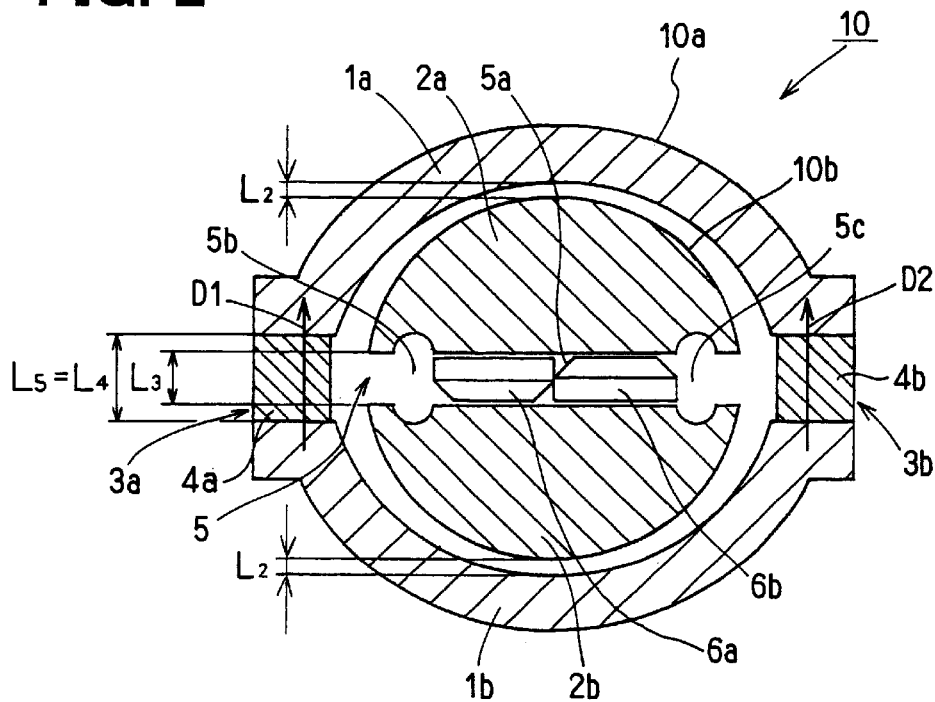
FIG. 2 is a transverse sectional view taken along a line II—II shown in FIG. 1.
Figure 3:
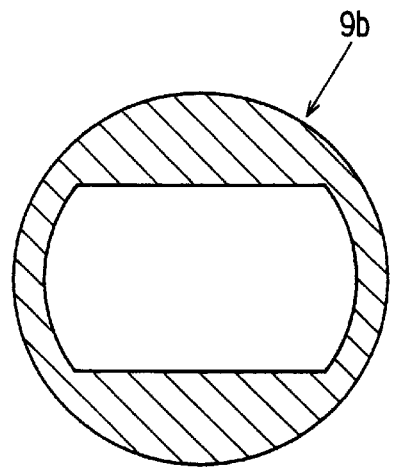
FIG. 3 is a transverse sectional view taken along a line III—III shown in FIG. 1.

FIGS. 1, 2 and 3 show a magnetic rotation angle sensor 10 according to a first embodiment of the present invention. The sensor 10 can be used for detecting an opening degree of a throttle valve for regulating an intake air amount of a vehicular internal combustion engine. The sensor 10 may be disposed on an end of a throttle valve shaft. The sensor 10 can be used for detecting other rotation angle such as a rotation angle of an arm portion of an industrial robot. The sensor 10 has a rotor 10a and a stator 10b.

The rotor 10a is connected with the end of the throttle shaft. The rotor 10a has yokes 1a and 1b, and magnets 4a and 4b. The yokes 1a and 1b are made of a magnetic material such as a soft iron. Each of the yokes 1a and 1b is formed into a semicircular shape so that the yokes 1a and 1b form a substantially cylindrical shape when the yokes are assembled. Therefore, the yokes 1a and 1b provides a cylinder that is capable of being separated at a diametric line. The yokes 1a and 1b define an inner cavity that is substantially ellipse. Two gaps 3a and 3b are defined between ends of the yokes 1a and 1b. The magnets 4a and 4b are permanent type magnets and disposed in the gaps 3a and 3b respectively. The magnet 4a is magnetized in a direction indicated by an arrow D1 as shown in FIG. 2. The magnet 4b is magnetized in a direction indicated by an arrow D2 as shown in FIG. 2. The magnetic polarities of the magnets 4a and 4b are in parallel and toward the same direction. The magnetized directions D1 and D2 are tangential to the ellipse that is defined by the yokes 1a and 1b. Therefore, the shortest distance of the gaps 3a and 3b is substantially equal to the height of the magnets 4a and 4b in the magnetized directions D1 and D2. The height of the magnets 4a and 4b in the magnetized directions D1 and D2 are designed to prevent short-circuiting magnetic flux leakage between the poles. According to the arrangement, the N pole appears on the yoke 1a and the S pole appears on the yoke 1b, and the rotor 10a provides a magnetic flux passing through the inner cavity.

The stator 10b has a columnar shape, and is disposed in the inner cavity of the rotor 10a. The stator 10b has a smooth curved outer profile as shown in FIG. 2. The outer profile may be a polygon. An axial length of the stator 10b is substantially equal to an axial length of the rotor 10a as shown in FIG. 1. The stator 10b is separated at a diametric line. The stator 10b has a pair of cores 2a and 2b made of a magnetic material such as a soft iron. Each of the cores 2a and 2b is a substantially half column shape. The cores 2a and 2b are spaced apart by a gap 5. The cores 2a and 2b defines the gap 5 that extends in a diametric direction. The gap 5 includes a detecting portion 5a and a wider portions 5b and 5c. The detecting portion 5a is defined by parallel surfaces of the cores 2a and 2b and located on the center of the gap 5. The wider portions 5b and 5c are located on both sides of the detecting portion 5a to concentrate the magnetic flux into the detecting portion 5a so as to improve the sensitivity. The wider portions 5b and 5c are defined by semicircular surfaces of the cores 2a and 2b. According to the embodiment, the yokes 1a and 1b surround the cores 2a and 2b, and define at least one of magnetic opening on an axial end.

Magnetic sensor elements 6a and 6b are disposed in the detecting portion 5a. Each of the magnetic sensor elements 6a and 6b is a molded integrated circuit that has a Hall effect element for detecting the magnetic flux and a signal amplifier circuit. The magnetic sensor elements 6a and 6b output signals that are indicative of a relative rotation angle between the rotor 10a and the stator 10b. Alternatively, the magnetic sensor element may have the Hall effect element alone. The amplifier circuit can be disposed separately or in an external circuit unit. The rotation angle can be detected by using only one of the magnetic sensor elements 6a and 6b.

A pair of spacers 8a and 8b are disposed on both axial sides of the cores 2a and 2b. The spacers 8a and 8b are made of non-magnetic material such as a resin. Each of the spacers 8a and 8b is a cylindrical shape that has a diameter equal to the outer diameter of the stator 10b. A pair of external magnetic guides 9a and 9b are disposed on both sides of the spacers 8a and 8b. The external magnetic guides 9a and 9b are made of magnetic material such as a soft iron. Each of the external magnetic guides 9a and 9b is formed into a ring shape that has a diameter equal to the outer diameter of the stator 10b. The spacers 8a and 8b has the same axial length for defining distances that is enough to isolate the external magnetic guides 9a and 9b from the magnetic field supplied by the magnets 4a and 4b and flows through the rotor 10a and the stator 10b. The spacers 8a and 8b define the distances for reducing leakage of the magnetic flux supplied by the magnets 4a and 4b. Alternatively, the spacers 8a and 8b are replaceable with air gaps which are defined by supporting the external magnetic guides 9a and 9b by housing or the like. Further, only one external magnetic guide may provide certain advantage.

In an operation of the magnetic rotation angle sensor 10, the magnets 4a and 4b generate a magnetic field via the yokes 1a and 1b, and supply a magnetic flux in the inner cavity. When the rotor 10a and the stator 10b are in an initial position as shown in FIG. 2, the core 2a only faces the yoke 1a. Therefore, the magnetic flux flows through the magnetic sensor elements 6a and 6b in a forward direction from the core 2a to the core 2b. As the rotor 10a is rotated relative to the stator 10b, the facing area between the core 2a and the yoke 1a is decreased. Therefore, the magnetic flux flows in the forward direction is decreased, and the magnetic flux flows in the counter direction is increased due to change of the facing area. The magnetic sensor elements 6a and 6b detects a density of the magnetic flux in one of the directions and output signals indicative of the density of the magnetic flux. Therefore, the signals are capable of indicating the rotation angle. The yokes and the cores modulate the magnetic flux supplied by the magnets so as to vary the density of the magnetic flux in accordance with relative rotation of the rotor and the stator. The output signals of the magnetic sensor elements 6a and 6b are, for example, inputted into an electronic control unit for the internal combustion engine, and utilized for controlling the internal combustion engine. The output signals are compared to ensure that the sensor elements 6a and 6b function properly, therefore it is possible to improve the reliability of the sensor 10. As described above, the rotor 10*a* and the stator 10*b* uses a radial magnetic flux with respect to the rotation axis.

When the sensor 10 is disposed in an external magnetic field directed in a diagonal direction of the sensor 10, the external magnetic flux is trapped by the external magnetic guides 9*a* and 9*b*. Since each of the external magnetic guides 9*a* and 9*b* is a ring shape, each of the external magnetic guides 9*a* and 9*b* provides a magnetic path connecting an upper area where the core 2*a* is located and a lower area where the other core 2*b* is located. Therefore, the external magnetic flux is guided to avoid the gap 5 and the magnetic sensor elements 6*a* and 6*b*, and flows axially between the external magnetic guides 9*a* and 9*b*. For example, the external magnetic flux flows along a path P1 as shown in FIG. 1. The external magnetic guides 9*a* and 9*b* provide a magnetic shield for the external magnetic field. The external magnetic guides 9*a* and 9*b* provide an external magnetic path for the external magnetic flux. The external magnetic path avoids the gap 5 and the magnetic sensor elements 6*a* and 6*b*. The external magnetic path has a smaller magnetic resistance relative to a diagonal path that passes through the gap 5 and the magnetic sensor elements 6*a* and 6*b*. The external magnetic guides 9*a* and 9*b* are located on both axial side of the rotor 10*a* and the stator 10*b* to provide axial magnetic path that does not pass through the magnetic sensor elements 6*a* and 6*b*.

In this embodiment, an axial length L1 of the spacers 8*a* and 8*b* are designed to satisfy the following relationship.

$$2 \times L1^2 > 2 \times L2^2 + L3^2$$

Where L1 is the axial length of the spacers 8*a* and 8*b*, L2 is a minimum distance between the yokes 1*a* and 1*b* and the cores 2*a* and 2*b*, and L3 is a distance of the detecting portion 5*a*.

The gaps are designed to satisfy the following relationship.

$$L4^2 > 2 \times L2^2 + L3^2$$

Where L4 is a distance of the gaps 3*a* and 3*b* where the magnets 4*a* and 4*b* are disposed, and the distance L4 is equal to the height L5 of the magnets 4*a* and 4*b*.

According to the embodiment presented above, it is possible to reduce the influence of the external magnetic field, and to detect an accurate rotation angle. It is possible to reduce leakage of the magnetic flux supplied by the magnets since the external magnetic guides are distanced enough from components that provide a magnetic path where the magnetic flux of the magnets flows. Additionally, since the magnets have enough height in the magnetized directions, it is possible to reduce short-circuiting leakage of the magnetic flux between the poles of the magnets.

Alternatively, the axial length L1 may be designed to satisfy the following relationship.

$$2 \times L1 > 2 \times L2 + L3$$

Figure 4:
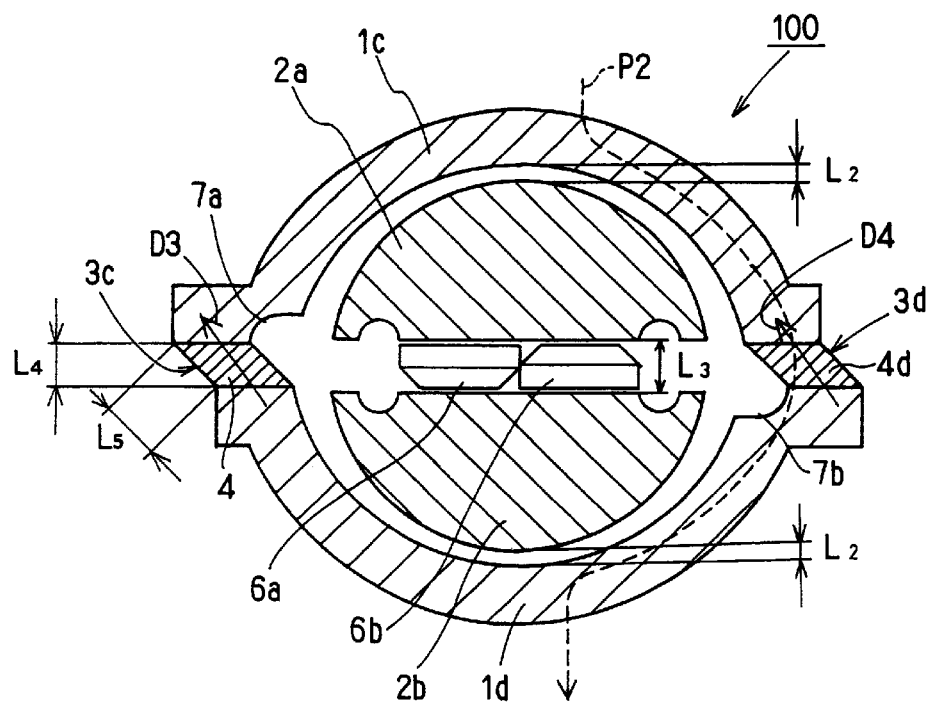
FIG. 4 is a transverse sectional view showing a magnetic rotation angle sensor according to a second embodiment of the present invention.

FIG. 4 shows a magnetic rotation angle sensor 100 according to a second embodiment of the present invention. The same reference numbers indicate the same or similar components to the first embodiment, and explanation will not be repeated. The sensor 100 has a similar longitudinal cross sectional view to the first embodiment as shown in FIG. 1. However, the sensor 100 does not have the external magnetic guides 9*a* and 9*b*. The sensor 100 may have the external magnetic guides 9*a* and 9*b*.

The sensor 100 has a pair of eccentric yokes 1*c* and 1*d*. Each of the yokes 1*c* and 1*d* has an outwardly shifted end.

Therefore, the yokes 1*c* and 1*d* define oblique gaps 3*c* and 3*d*. Magnets 4*c* and 4*d* are disposed in the gaps 3*c* and 3*d*. The yokes 1*c* and 1*d* have concaved portions 7*a* and 7*b* next to the shifted ends. The concaved portions 7*a* and 7*b* provide sufficient air gaps between the poles of the magnets 4*c* and 4*d*. The magnet 4*c* has a parallelogram cross-section, and is magnetized in a direction D3 parallel to the oblique sides of the magnet 4*c*. The gaps 3*c* and 3*d* has a distance L4 that is substantially equal to the height of the magnets 4*c* and 4*d*. The magnet 4*c* has a distance L5 in parallel to the magnetized direction D3. The distance L5 is longer than the height of the magnet 4*c*, and is enough to reduce a short-circuiting leakage of the magnetic flux supplied by the magnet 4*c*. The magnet 4*d* is formed as well as the magnet 4*c*, and magnetized in a direction D4. According to the embodiment, relatively short gaps 3*c* and 3*d* are provided.

When the sensor 100 is disposed on an external magnetic field perpendicular to an rotation axis of the sensor 100, the external magnetic flux can flow through the gaps 3*c* and 3*d*. As a result, the external magnetic flux does not enter the cores 2*a* and 2*b*, and does not flow through the detecting portion 5*a* of the gap 5 and the magnetic sensor elements 6*a* and 6*b*. Therefore, in this embodiment, the yokes 1*c* and 1*d* provides an external magnetic path for the external magnetic flux. The external magnetic path avoids the gap 5 and the magnetic sensor elements 6*a* and 6*b*. The external magnetic path runs circumferentially, and has a smaller magnetic resistance than that of the magnetic path through the gap 5. Each of the magnets 4*c* and 4*d* has the distance L5 in the magnetized direction D3 or D4 that is longer than the shortest distance L4 of the poles of the magnet. Therefore, it is possible to reduce the short-circuiting leakage of the magnetic flux between the poles. The yokes 1*c* and 1*d*, the gaps 3*c* and 3*d*, and the magnets 4*c* and 4*d* provide external magnetic flux guiding means that guides the external magnetic flux so as to avoid the detecting portion 5*a*. Additionally, the obliquely magnetized magnets 4*c* and 4*d* provide leakage reducing means for reducing leakage of the magnetic flux supplied by the magnets 4*c* and 4*d*.

In this embodiment, the gaps are designed to satisfy both of the following relationships.

$$L4^2 < 2 \times L2^2 + L3^2$$

$$L5^2 > 2 \times L2^2 + L3^2$$

Alternatively, the gaps may be designed to satisfy both of the following relationships.

$$L4 < 2 \times L2 + L3$$

$$L5 > 2 \times L2 + L3$$

Alternatively, the magnets and the yokes may be provided as a stator, and the cores and the magnetic sensor elements may be provided as a rotor.

Figure 5:
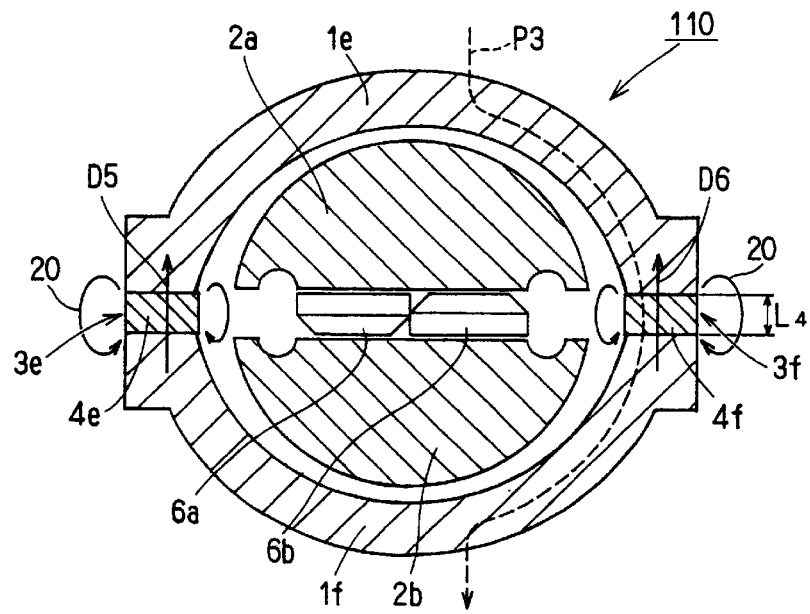
FIG. 5 is a transverse sectional view showing a magnetic rotation angle sensor according to a comparative embodiment of the present invention.
Figure 6:
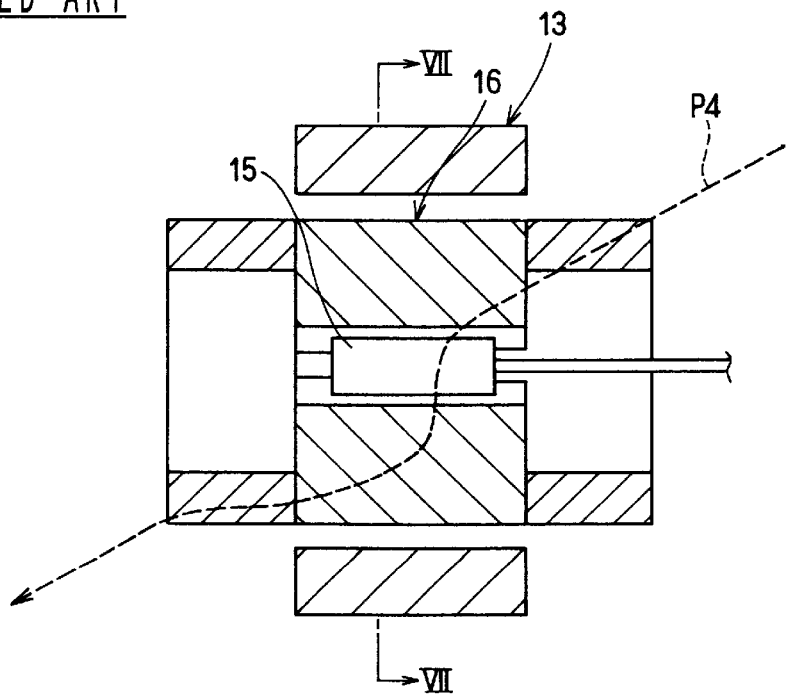
FIG. 6 is a longitudinal sectional view showing a magnetic rotation angle sensor according to a related art.
Figure 7:
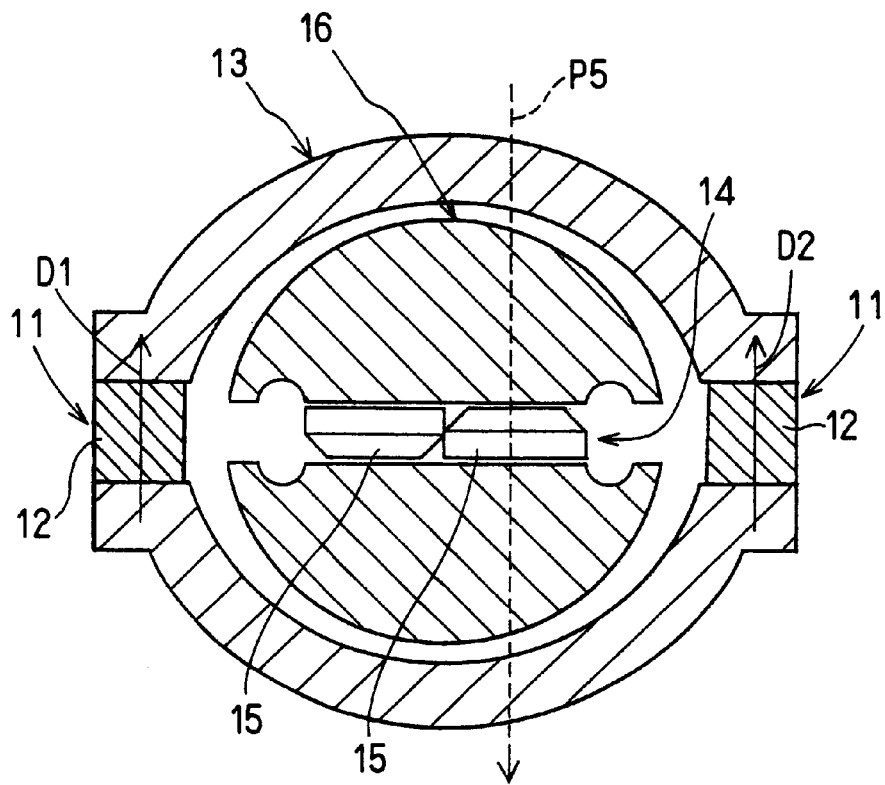
FIG. 7 is a transverse sectional view taken along a line VII—VII as shown in FIG. 6.

FIG. 5 is a magnetic rotation angle sensor 110 according to a comparative embodiment. A yoke 1*e* and a yoke 1*f* define shorter gaps 3*e* and 3*f* in which thinner plate magnet 4*e* and 4*f* are disposed. The magnets 4*e* and 4*f* are magnetized in direction D5 and D6 that are tangential to the ellipse defined by the yokes 1*e* and 1*f*. According to the arrangement shown in FIG. 5, the external magnetic flux may pass the gap 3*e* and 3*f* as shown by a broken line P3. However, the magnets 4*e* and 4*f* are too thin to prevent short-circuiting leakage 20 of the magnetic flux.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A magnetic rotation angle sensor for detecting a rotation angle of a rotor relative to a stator, comprising:
   a magnet;
   a yoke disposed on one of the rotor and the stator;
   a core disposed on the other one of the rotor and the stator, the core being arranged to modulate a magnetic flux of the magnet in accordance with a relative rotation of the rotor and the stator;
   a magnetic sensor element disposed on the core, that detects the magnetic flux modulated by the core;
   a first means for providing an external magnetic path for an external magnetic flux, the external magnetic path avoiding the magnetic sensor element and having a magnetic resistance lower than that of a magnetic path passing through the magnetic sensor element; and
   a second means for reducing short-circuiting leakage of the magnetic flux supplied by the magnet.

2. The magnetic rotation angle sensor claimed in claim 1, wherein the yoke and the core provide a magnetic path extending in a radial direction with respect to a rotation axis, and the magnetic sensor element is responsive to the magnetic flux in the radial direction, and the external magnetic path runs through the yoke or the core in a direction other than the radial direction.

3. The magnetic rotation angle sensor claimed in claim 2, wherein the core is a columnar shape along the rotation axis, and defines a gap extending in a diametric direction in which the magnetic sensor element is disposed.

4. The magnetic rotation angle sensor claimed in claims 1, wherein the first means is at least one of external magnetic guide disposed on an axial side of the rotor and the stator, the external magnetic guide providing an axially extending magnetic path through the core, and the second means is the magnet that has a certain distance in a magnetized direction.

5. The magnetic rotation angle sensor claimed in claim 4, wherein the external magnetic guide is spaced apart a certain distance from the yoke and the core in an axial direction.

6. The magnetic rotation angle sensor claimed in claim 4, wherein the first means is a pair of the external magnetic guide disposed on both axial side of the yoke and the core.

7. The magnetic rotation angle sensor claimed in claim 1, wherein the first means is the yoke that is arranged to surround the core and provides a circumferentially extending magnetic path as the external magnetic path, and the second means is the magnet that has a certain distance in a magnetized direction.

8. The magnetic rotation angle sensor claimed in claim 7, wherein the circumferentially extending magnetic path passes through a gap defined by the yoke.

9. The magnetic rotation angle sensor claimed in claim 8, wherein the magnet is disposed in the gap, and is magnetized in an oblique direction to provide a longer distance between the poles than the height equal to the gap.

10. The magnetic rotation angle sensor claimed in claim 8, wherein the magnet has a parallelogram cross-section, and is magnetized in the oblique direction.

11. A magnetic rotation angle sensor for detecting a rotation angle of a rotor relative to a stator, comprising:
    a magnet;
    a yoke disposed on one of the rotor and the stator;
    a core disposed on the other one of the rotor and the stator, the core being arranged to modulate a magnetic flux of the magnet in accordance with a relative rotation of the rotor and the stator;
    a magnetic sensor element disposed in a gap defined by the core, that detects the magnetic flux modulated by the core;
    a pair of spacers disposed on both axial side of the core, the spacers being made of nonmagnetic material; and
    a pair of external magnetic guides disposed on both axial side of the spacers, the external magnetic guides being made of magnetic material, and guiding an external magnetic flux in an axial direction from one of the external magnetic guide to the other one of the external magnetic guide through the core, wherein the core has a gap in which the magnetic sensor element is disposed, and the magnet has a distance between the poles longer than a distance of the gap.

12. The magnetic rotation angle sensor claimed in claim 11, wherein each of the spacers has an axial length L1 designed to satisfy the following relationship: $2 \times L1^2 > 2 \times L2^2 + L3^2$, where L2 is the shortest distance between the yoke and the core, and L3 is the distance of the gap in which the magnetic sensor element is disposed.

13. The magnetic rotation angle sensor claimed in claim 11, wherein each of the spacers has an axial length L1 designed to satisfy the following relationship: $2 \times L1 > 2 \times L2 + L3$, where L2 is the shortest distance between the yoke and the core, and L3 is the distance of the gap in which the magnetic sensor element is disposed.

14. A magnetic rotation angle sensor for detecting a rotation angle of a rotor relative to a stator, comprising:
    a magnet;
    a yoke disposed on one of the rotor and the stator;
    a core disposed on the other one of the rotor and the stator, the core being arranged to modulate a magnetic flux of the magnet in accordance with a relative rotation of the rotor and the stator; and
    a magnetic sensor element disposed in a gap defined by the core, that detects the magnetic flux modulated by the core, wherein
    the yoke comprises a first yoke and a second yoke defining a gap therebetween, the gap having a distance, and
    the magnet is disposed in the gap, and has a magnetized direction oblique to a direction of the distance of the gap, and has a distance between the poles longer than the distance of the gap.

15. The magnetic rotation angle sensor claimed in claim 14, wherein the distance L4 of the gap and the distance L5 between the poles are designed to satisfy both of the following relationships: $L4^2 < 2 \times L2^2 + L3^2$, and $L5^2 > 2 \times L2^2 + L3^2$, where L2 is the shortest distance between the yoke and the core, and L3 is the distance of the gap in which the magnetic sensor element is disposed.

16. The magnetic rotation angle sensor claimed in claim 14, wherein the distance L4 of the gap and the distance L5 between the poles are designed to satisfy both of the following relationships: $L4 < 2 \times L2 + L3$, and $L5 > 2 \times L2 + L3$, where L2 is the shortest distance between the yoke and the core, and L3 is the distance of the gap in which the magnetic sensor element is disposed.

* * * * *